United States Patent [19]

Akahira et al.

[11] Patent Number: 5,527,661
[45] Date of Patent: Jun. 18, 1996

[54] OPTICAL INFORMATION RECORDING MEDIUM

[75] Inventors: Nobuo Akahira, Yawata; Eiji Ohno, Hirakata; Kenichi Nishiuchi, Moriguchi; Kenichi Nagata, Nishinomiya; Yoshitaka Sakaue, Nara; Noboru Yamada, Hirakata, all of Japan

[73] Assignee: Matsushita Electric Industrial Co., Ltd., Kadoma, Japan

[21] Appl. No.: 512,131

[22] Filed: Aug. 7, 1995

Related U.S. Application Data

[63] Continuation of Ser. No. 156,466, Nov. 23, 1993, abandoned.

[30] Foreign Application Priority Data

Nov. 25, 1992 [JP] Japan .................................. 4-314811
Jan. 19, 1993 [JP] Japan .................................. 5-006399

[51] Int. Cl.$^6$ .................................................... G11B 7/24
[52] U.S. Cl. ........................ 430/270.13; 430/21; 430/945; 369/275.2; 369/284
[58] Field of Search .............................. 430/270.13, 290, 430/19, 21, 945; 369/275.2, 284

[56] References Cited

U.S. PATENT DOCUMENTS

| | | | |
|---|---|---|---|
| 3,971,874 | 7/1976 | Ohta et al. | 428/432 |
| 4,624,914 | 11/1986 | Kimura et al. | 430/495 |
| 4,787,077 | 11/1988 | Barton et al. | 369/100 |
| 4,860,273 | 8/1989 | Sawano et al. | 369/100 |
| 4,924,436 | 5/1990 | Strand | 365/113 |
| 5,249,175 | 9/1993 | Akahira et al. | 369/275.1 |
| 5,273,861 | 12/1993 | Yamada et al. | 430/271 |
| 5,294,518 | 3/1994 | Brandy et al. | 430/290 |

FOREIGN PATENT DOCUMENTS

| | | | |
|---|---|---|---|
| 54-3725 | 2/1979 | Japan . | |
| 60-157894 | 8/1985 | Japan | 430/290 |
| 62-40648 | 2/1987 | Japan . | |
| 63-225934 | 9/1988 | Japan . | |
| 1149238 | 6/1989 | Japan . | |
| 273537 | 3/1990 | Japan . | |
| 29955 | 3/1990 | Japan . | |
| 2113451 | 4/1990 | Japan . | |
| 2139718 | 5/1990 | Japan . | |
| 2185737 | 7/1990 | Japan . | |
| 258690 | 12/1990 | Japan . | |
| 340222 | 2/1991 | Japan . | |
| 341638 | 2/1991 | Japan . | |
| 430192 | 2/1992 | Japan . | |

OTHER PUBLICATIONS

Yamada et al; *Japanese Journal of Applied Physics*, vol. 26, 1987, Supplement 26–4, pp. 61–66, "High Speed Overwritable Phase Change Optical Disk Material".

Levi, *Applied Optics*, A Guide to Optical System Design/ vol. 2, 1980, pp. 62–74, "Spectral Filters".

Abstract of JP 2-266978, "Optical Information Recording Medium", Kobayashi (Oct. 1990).

*Primary Examiner*—Charles L. Bowers, Jr.
*Assistant Examiner*—John A. McPherson
*Attorney, Agent, or Firm*—Renner, Otto, Boisselle & Sklar

[57] ABSTRACT

An optical recording medium according to the present invention includes a substrate, and a recording film formed on the substrate, when receiving a laser beam for recording, the recording film taking either a first structural state or a second structural state according to the intensity of the laser beam; when receiving a laser beam for reproducing, the recording film partially changing the optical phase of the laser beam for reproducing according to the structural state, thereby changing the intensity of the laser beam for reproducing, wherein the optical absorbance of the recording film in the first structural state is substantially equal to that of the recording film in the second structural state, and the refractive index of the recording film in the first structural state is substantially different from that of the recording film in the second structural state.

15 Claims, 16 Drawing Sheets

OPTICAL INFORMATION RECORDING MEDIUM

This is a continuation of application(s) Ser. No. 08/156,466 filed on Nov. 23, 1993 now abandoned.

BACKGROUND OF THE INVENTION

1. Field of the Invention

The present invention relates to an optical information recording medium for recording and reproducing information with high density by using a laser beam.

2. Description of the Related Art

In order to write a large volume of information into an optical information recording medium, a laser beam having a small diameter is used for heating selected microscopic areas of the recording medium. The optical characteristics of the heated areas of the recording layer of the recording medium is changed, and the change thereof can be optically read out by using a laser beam for reproducing.

A laser beam having a size in the order of a wavelength of the laser beam can be obtained by focusing a laser beam emitted from a laser diode with a lens system. Such a small laser beam can provide a large amount of energy to a unit area of an optical recording medium, even when a laser diode with a low power output is used as a light source.

A basic structure of a conventional optical information recording medium includes a recording thin film layer which is optically changed by the irradiation of a laser beam formed on a flat substrate.

The procedures of recording and reproducing information are conducted as follows:

While a flat-plate shaped recording medium is moved by a rotating means or a translating means such as a motor, a laser beam is focused onto a recording thin film of the recording medium. The energy of the laser beam is absorbed into the recording thin film, resulting in the rise in temperature of the recording thin film.

In a writing mode, the recording thin film is irradiated with a laser beam whose optical output power level is varied across a certain threshold power in response to modulation signals. The optical state of the irradiated portion of the recording thin film is changed, whereby information is recorded therein. The threshold power depends on thermal characteristics of the substrate, a relative velocity to the laser spot of the recording medium and the like, as well as characteristics of the recording thin film themselves.

In a reproducing mode, the recorded part and non-recorded part of the recording thin film are irradiated with a laser beam whose output level is sufficiently lower than the threshold power. The changes in the optical characteristics of the recorded part and the non-recorded part are optically detected, whereby information recorded in the recording medium is reproduced. Herein, the recorded part corresponds to a portion where information is recorded; the non-recorded part corresponds to a portion where no information is recorded.

A structural phase changeable type recording medium includes a recording thin film whose optical constant is changeable without almost any change in shape. An optical constant of the recording thin film can be changed by changing crystallinity of the recording thin film. In more detail, the state of the recording thin film is changed between an amorphous state and a crystalline state by the irradiation of the laser beam, and at least either the extinction coefficient or refractive index of the recording thin film is changed, whereby information is recorded.

Between the both states of the recording thin film, the reflectance, i.e., the amplitude of reflected light, is varied, so that the change in the intensity of the reflected light is detected by a detection system, whereby information is reproduced. Since the structural phase changeable type recording medium is not changed in shape, an air-sandwich structure such as an ablative type medium is not required. Therefore, the recording medium can be fabricated in a simple way with a low cost, requiring a simple adhesion protect structure or the like.

As a recording thin film material, an amorphous chalcogenide thin film can be used. Examples thereof include an oxide thin film mainly containing tellurium (Te) and tellurium oxide ($TeO_2$), a thin film mainly containing tellurium (Te), tellurium oxide ($TeO_2$) and Palladium (Pd), and a thin film mainly containing Germanium (Ge), Antimony (Sb) and tellurium (Te). These thin films are disclosed in Japanese Patent Publication No. 54-3725 and U.S. Pat. No. 3,971,874; Japanese Patent Publication No. 2-9955 and U.S. Pat. No. 4,624,914; and Japanese Laid-Open Patent Publication No. 62-209742, Japanese Laid-Open Patent Publication No. 63-225934 and "High speed overwritable phase change optical disk material" (Japanese Journal of Applied Physics, vol. 26 (1987) suppl. 26-4), respectively.

In the structural phase changeable type optical recording medium, an "overwrite" in which new information can be recorded while erasing information already recorded can be carried out by modulating the power level of a laser beam between a relative high recording power and a relative low erasing power (see Japanese Patent Publication No. 2-58590). An amorphous state is formed by heating the thin film material over the melting point and quenching it by the recording power. Further, a crystalline state is obtained by heating the thin film material up to the temperature for crystallization by a relative low erasing power. Portions irradiated with the laser beam of the recording power become amorphous, and portions irradiated with that of the erasing power become crystalline. Accordingly, even though the recording thin film material is in any type of optical state before recording, the overwrite record can be realized by radiating the laser beam only one time.

The structural phase changeable type optical recording medium includes a substrate, a first transparent layer having a refractive index different from that of the substrate, a recording thin film layer, a second transparent layer, and a reflective layer. An inorganic dielectric having a high melting point is used for the transparent layer, and metal is used for the reflective layer. Due to such a structure, when the recording thin film layer is subjected to the structural phase change, i.e., especially when the state of the layer is changed into an amorphous state, the shape thereof is hardly changed even after being put in the melted state. In addition, the structural phase changeable type optical recording medium is usually formed by selecting the thickness of respective layers so as to increase the reflectance change in structural phase change and optical absorbance.

Since the structural phase changeable type optical recording medium can reproduce information by changing the intensity of reflected light, the medium can be compatible with a recording medium (replica disk) in which information previously recorded by uneven pits, such as a video disk (brand name: laser disk) and a digital audio disk (brand name: compact disk), under the condition that the absolute value of the reflectance of such mediums is large. That is, signals can be reproduced in such a player that only has a function of reproducing signals. The replica disk usually includes a metal thin film having a large reflectance made of aluminum (Al) or the like, provided on a resin substrate on which uneven pits are formed, so that a flat portion thereof has 70% or more of reflectance. In general, as the reflectance comes close to this value, the optical recording medium is likely to be compatible with the replica disk.

However, in a conventional structural phase changeable type optical recording medium, a laser beam is hardly transmitted through the medium; instead, the laser beam is partially absorbed in the medium, and the remaining beam is reflected. The laser beam may be absorbed in the reflective layer, whose absorption can be neglected.

Further, the optical recording medium reproduces signals by detecting the reflectance change; however, when the modulation obtained by the ratio of the reflectance change after recording to the reflectance before recording is increased, the reflectance of either the amorphous state or the crystalline state should be increased and that of the other decreased. In this case, the optical absorbance of each state will be reverse with respect to the case of the reflectance. Each reflectance of the non-recorded state (crystalline state) and the recorded state (amorphous state) is defined, for example, as Rc and Ra. Further, each optical absorbance is defined as (1-Rc) and (1-Ra), the ratio thereof being (1-Rc)/(1-Ra). When new information is overwritten in the recording medium whose ratio (1-Rc)/(1-Ra) is large, the new information cannot be appropriately recorded for the following reason: Although the amorphous portion and the crystalline portion are respectively irradiated with the laser beam of the same power, the energy of the laser beam is not absorbed with the same degree. As a result, a final temperature and a size of an area where the signals are recorded are different in each portion, and the shape of the area is distorted. In the conventional structural phase changeable type recording medium, the reflectance of the laser beam is 20% to 30% in the crystalline state and 0% to 10% in the amorphous state, the difference thereof being approximately 20%. In this case, the absorbance is 70% to 80% and 90% or more, respectively. Therefore, the ratio (1-Rc)/(1-Ra) is comparatively small, resulting in small influence on overwrite characteristics. In order to increase the modulation by making the reflectance close to 70% in the non-recorded state, the reflectance of the recorded state is made, for example, 30% or less, so that the optical absorbance of the crystalline state becomes 30% or less; the optical absorbance of the amorphous state becomes 70% or more, whereby the ratio thereof becomes double or more. In this case, overwriting cannot substantially be conducted.

As described above, the structural phase changeable type recording medium cannot conduct the overwrite nor be compatible with the replica disk, under the condition that the reflectance is large.

A method for improving erase characteristics by adjusting the optical absorbance difference of the recording thin film has been proposed (Japanese Laid-Open Patent Publication No. 1-149238). According to the method, the laser beam can be absorbed into the recording thin film layer almost equally in the amorphous state and the crystalline state, thereby improving the overwrite characteristics. Further, the following is also disclosed: Although the thin film in the amorphous state absorbs the same energy of the laser beam as that in the crystalline state, the amorphous state becomes higher because of the different thermal conditions caused by the thermal material difference, such as thermal conductivity and latent heat of fusion. Therefore, a larger absorbance can be obtained in a more crystalline state. However, also in this case, signals are reproduced by taking advantage of the reflectance change, so that it is difficult to achieve a recording medium with a high reflectance and also a large reflectance change and modulation.

SUMMARY OF THE INVENTION

An optical recording medium according to the present invention includes: a substrate, and a recording film formed on the substrate, said recording film receiving a laser beam for recording and taking either a first structural state or a second structural state according to the intensity of the laser beam; and said recording film receiving a laser beam for reproducing and locally changing an optical phase of the laser beam for reproducing according to the structural state, thereby changing the intensity of the laser beam for reproducing, wherein the optical absorbance of the recording film in the first structural state is substantially equal to that of the recording film in the second structural state, and the complex refractive index of the recording film in the first structural state is substantially different from that of the recording film in the second structural state.

In one embodiment, the difference between the refractive index of the recording film in the first structural state and that of the recording film in the second structural state is large enough to change the optical phase of the laser beam for reproducing so that the intensity of the laser beam for reproducing is changed with a level for optically detecting.

In one embodiment, the amplitude of the laser beam for recording is substantially maintained at a fixed value while the optical phase of the laser beam for reproducing is changed according to the structural state of the recording film.

Alternatively, an optical recording medium according to the present invention includes: a substrate, and a structural phase changeable type recording film formed on the substrate, the recording film receiving a laser beam for recording and taking either a first structural state or a second structural state according to the intensity of the laser beam; and the recording film receiving a laser beam for reproducing and locally changing an optical phase of the laser beam for reproducing according to the structural state, thereby changing the intensity of the laser beam for reproducing, wherein the recording film includes a first transparent layer, a structural phase changeable type recording layer formed on the first transparent layer, and a second transparent layer formed on the structural phase changeable type recording layer; and optical thicknesses of the first and second transparent layers and the structural phase changeable type recording layer are selected so that the optical absorbance of the structural phase changeable type recording layer in the first structural state and that of the structural phase changeable type recording layer in the second structural state are substantially equal, and the complex refractive index of the structural phase changeable type recording layer in the first structural state and that of the structural phase changeable type recording layer in the second structural state are substantially different.

In one embodiment, the structural phase changeable type recording layer is made of a material which changes in structural phase between a crystalline state and an amorphous state; and the optical absorbance Ac of the structural phase changeable type recording layer in the crystalline state and the optical absorbance Ac of the structural phase changeable type recording layer in the amorphous state have the difference thereof (Ac-Aa) in the range of 0% to 20%.

In one embodiment, the structural phase changeable type recording layer is made of a material which changes in structural phase between a crystalline state and an amorphous state; and the optical absorbance Ac of the structural phase changeable type recording layer in the crystalline state and the optical absorbance Aa of the structural phase changeable type recording layer in the amorphous state have the difference thereof (Ac-Aa) in the range of 0% to 10%.

In one embodiment, the recording film includes a reflective layer formed on the second transparent layer.

In one embodiment, the structural phase changeable type recording layer is made of a material containing antimony (Sb) and selenium (Be).

In one embodiment, the structural phase changeable type recording layer is made of a material containing germanium (Ge) and tellurium (Te).

In one embodiment, the difference between the optical absorbance of the structural phase changeable type recording layer in the first structural state and that of the structural phase changeable type recording layer in the second structural state is 0% to 10% of the laser beam for reproducing.

In one embodiment, the optical phase shaft $\Delta\phi$ of the laser beam for reproducing due to changes in the structural state is represented as $\Delta\phi=(1\pm2N)\pi$. Here, N is zero or an integer number.

In one embodiment, the optical phase shift $\Delta\phi$ of the laser beam for reproducing due to changes in the structural state is in the range represented as $3\pi/2 \geq \Delta\phi \geq \pi/2$, or $-3\pi/2 \leq \Delta\phi \leq -\pi/2$.

In one embodiment, the reflectance of the structural phase changeable type recording thin film is 40% or more in any one of the first structural state and the second structural state.

In one embodiment, the reflectance of the structural phase changeable type recording thin film is 20% or more in any one of the firs% structural state and the second structural state.

Alternatively, an optical recording medium according to the present invention includes: a substrate, and a structural phase changeable type recording layer formed on the substrate, said recording layer receiving a laser beam for recording and taking either a first structural state or a second structural state according to the intensity of the laser beam; and said recording layer receiving a laser beam for reproducing and locally changing an optical phase of the laser beam for reproducing according to the structural state, thereby changing the intensity of the laser beam for reproducing, wherein at least one of the extinction coefficients (k) of the structural phase changeable type recording layer in the first structural state and that of the structural phase changeable type recording layer in the second structural state is 1.0 or less; and the refractive index (n) of the structural phase changeable type recording layer in the first state is one and a half times as large as that of the structural phase changeable type recording layer in the second structural state.

Alternatively, an optical recording medium according to the present invention includes: a substrate, and a structural phase changeable type recording film formed on the substrate, said recording layer receiving a laser beam for recording and taking either a first structural state or a second structural state according to the intensity of the laser beam; and said recording film receiving a laser beam for reproducing and locally changing an optical phase of the laser beam for reproducing according to the structural state, thereby changing the intensity of the laser beam for reproducing, wherein the extinction coefficients (k) of the structural phase changeable type recording layer in the first structural state and the second structural state is 1.0 or less; the refractive index (n) of the structural phase changeable type recording layer in the second structural state is 2.0 or more; and the refractive index of the structural phase changeable type recording layer in the first structural state is one and a half times as large as that in the second structural state.

In one embodiment, the recording film includes a protective layer formed on the reflective layer.

Thus, the invention described herein makes possible advantages of (1) restraining the distortion of the recording state in the recorded portion and the non-recorded portion during the overwrite recording caused by the differences of temperature rise conditions and (2) providing a recording medium in which signals can be overwritten even under the high reflectance.

Due to the above-mentioned structure, signals can be reproduced as the changes in the intensity of the reflected light caused by the optical phase shift, not as the changes in the magnitude of the reflectance, so that signals with large modulation can be obtained without making the absorbance change. Since the absorbance change is small between the recorded portion and the non-recorded portion in the recording medium of the present invention, the same temperature rise condition of the recording thin film can be obtained in an overwriting mode regardless of the previous state (i.e., crystalline state or amorphous state), whereby the same recording state can be obtained. As a result, excellent overwrite can be realized. Accordingly, even using a medium having a high reflectance, overwriting can be realized.

Further, the optical phase shift can be recorded with a recording thin film layer having the above-mentioned structure optically compatible with a recording thin film layer having uneven shapes. Accordingly, the recording medium of the present invention can perform recording with a large recording density, as well as a structural phase changeable type recording, and can easily be compatible with the replica disk having concave and convex pits such as audio disk and video disk.

Light is a wavelength, and is defined by an amplitude and the optical phase shift. The state of light is changed by reflection, that is, the amplitude and optical phase shift thereof are changed. Here, the amplitude change of the reflected light and the optical phase shift thereof are referred to as the reflectance change and the optical phase shift, respectively. When light is irradiated to the concave and convex pits of the replica disk, there is no reflectance change between the pit portions and the peripheral portions. However, due to the difference in the levels of the concave and convex portions, the optical phase of the reflected light is different. As a result, the reflected light from the pit portions and the peripheral portions are interfered with each other, whereby light to be transmitted into the detection system is reduced. On the contrary, in the conventional structural phase changeable type recording medium, the reflectance is different between the recorded portion and the non-recorded portion, whereby the amplitude of the reflected light is different.

The structural phase changeable type recording medium in which recording and reproducing information are carried out using optical phase shift effect has been already proposed (Japanese Laid-Open Patent Publication Nos. 2-73537, 2-113451 and 3-41638). The structural phase changeable type recording medium in which recording and reproducing information are carried out using optical phase shift effect can provide the recording method optically compatible with that for the existing recording medium having concave and convex pits, so that recording with a large recording density can be conducted. The structural phase changeable type recording medium in which recording and reproducing information are carried out by using optical phase shift effect can easily be compatible with the replica disk having concave and convex pits such as audio disk and video disk. Further, in the structural phase changeable type recording medium, the recorded portion can be changed into The non-recorded portion (i.e., the erase and The rewrite can be conducted), whereby rewrite can be realized.

According to the present invention, by selecting the absorbance conditions of the recorded portion and the non-recorded portion of the structural phase changeable type recording medium in which recording and reproducing information are carried out using optical phase shift effect, the temperature rise conditions of the both portion can be made equal.

As is mentioned above, small absorbance change which cannot be obtained by the reflectance change can be realized by using the optical phase shift, and the distortion of the recorded state caused by the difference of temperature rise conditions in the recorded portion and the non-recorded portion can be restrained during overwrite recording, whereby overwrite rewriting can be realized with high reflectance.

These and other advantages of the present invention will become apparent to those skilled in the art upon reading and understanding the following detailed description with reference to the accompanying figures.

BRIEF DESCRIPTION OF THE DRAWINGS

FIGS. 2 to 7 are obtained by using GeTe for a recording thin film material. FIGS. 8 to 16 are obtained by using $Sb_2Se_3$ for the recording thin film material.

DESCRIPTION OF THE PREFERRED EMBODIMENTS

The present invention will be described by way of illustrating examples with reference to the drawings.

Figure 1:
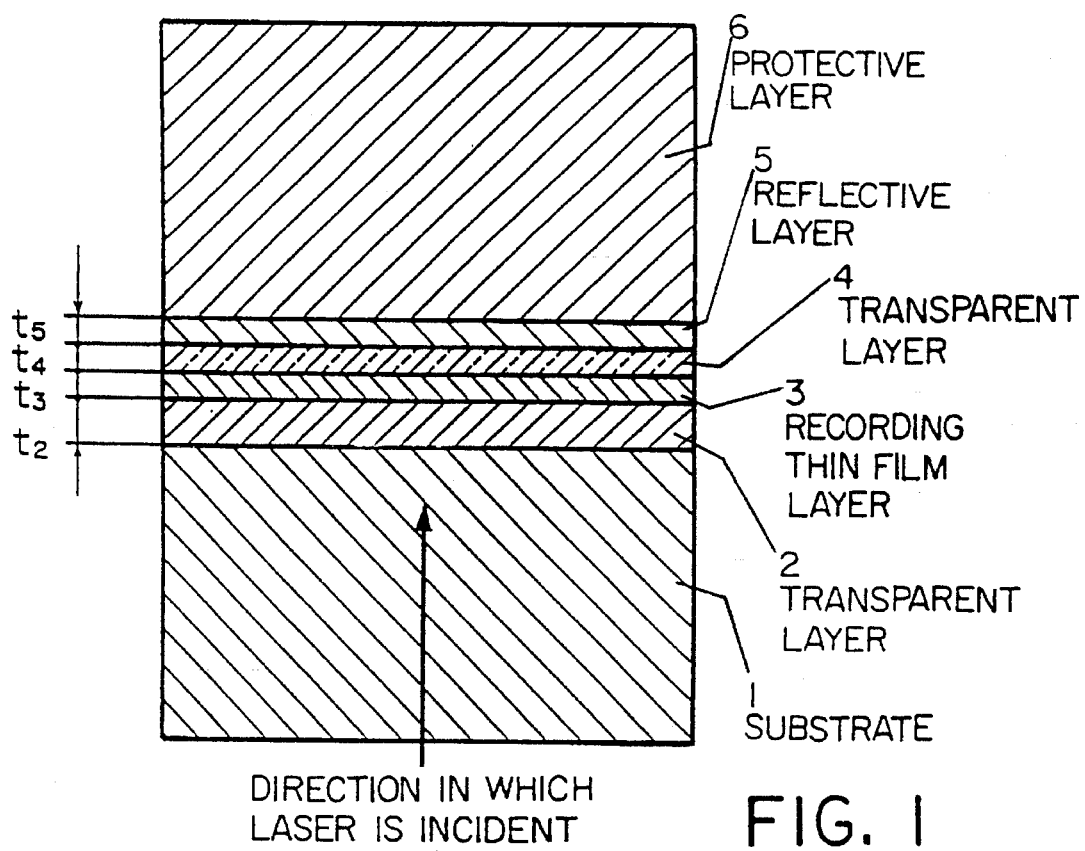
FIG. 1 shows a schematic diagram of one example of the present invention.

As is shown in FIG. 1, the optical recording medium according to the present invention comprises a substrate 1, a transparent layer 2 made of a dielectric or the like, a recording thin film layer 3, a transparent layer 4 made of a dielectric or the like, a reflective layer 5, and a protective layer 5. The material of the transparent layer 2 is different from that of the substrate 1 in refractive index. The protective layer 6 can be omitted. In this case, air serves as an element which is optically equivalent to a protective layer which has a refractive index of 1.0 and a substantially infinite thickness.

The recording thin film layer 3, transparent layers 2 and 4, and reflective layer 5 have respective thickness defined as $t_3$, $t_2$, $t_4$, and $t_5$. By appropriately regulating these thicknesses, a medium having a large optical phase shift and a small absorbance change can be obtained.

A transparent flat plate with a smooth surface such as glass plate or resin plate can be used for the substrate 1. Guide grooves for a tracking guide may be formed on the surface of the substrate 1.

A material coated with a resin dissolved in a solvent and dried; or a material adhering with a resin plate with an adhesive; or the like can be used for the protective layer 6.

As a material for the recording thin film layer 3 of a structural phase changeable type, materials which change in structural phase between an amorphous state and a crystalline state can be used. Specifically, a chalcogenide compound of SbTe, InTe, GeTeSn, SbSe, TeSeSb, SnTeSe, InSe, TeGeSnO, TeGeSnAu, TeGeSnSb type, or the like can be used. Further, an oxide material of Te-$TeO_2$, Te-$TeO_2$-Au, and Te-$TeO_2$-Pd type, or the like can be used. Moreover, a metallic compound of AgZn and InSb type, or the like, which changes in phase be%ween the crystalline states different from each other.

As a material used for the present invention, a material having a relatively small extinction coefficient k and largely variable refractive index n is preferred. In particular, a compound GeTe containing germanium (Ge) and tellurium (Te) is preferred. The use of GeTe for a recording thin film layer is disclosed in Japanese Laid-Open Patent Publication No. 62-40648. In general, a compound including Se has a small extinction coefficient. Thus, a compound $Sb_2Se_3$ containing antimony (Sb) and selenium (Se) is especially preferred. The use of $Sb_2Se_3$ is disclosed in Japanese Laid-Open Patent Publication No. 2-266978. Further, a compound containing germanium (Ge), antimony (Sb) and tellurium (Te) is preferred.

As a material of the transparent layers 2 and 4, an oxide, such as $SiO_2$, SiO, $TiO_2$, MgO, $GeO_2$; a nitride such as $Si_3N_4$ and BN; a sulfide such as ZnS, ZnTe, PbS; or the mixture thereof can be used. These materials are dielectric and have a high melting point.

As a material of the reflective layer 5, a metallic material such as Au, Al and Cu; dielectric multilayer having a large reflectance for a laser wavelength; or the like can be used.

These layers can be formed by a vacuum deposition method using a plurality of deposition sources, a sputtering method using a target containing each material in a mosaic shape, or the like.

EXAMPLE 1

The first example of the present invention is described with reference to FIG. 1. In this example, a compound (GeTe) containing germanium (Ge) and tellurium (Te) is used as a material of the recording thin film layer 3. In general, a thin film made of the compound GeTe can be formed in an amorphous state on a substrate by the DC sputtering method using a target containing Ge and Te. The optical constant of such a thin GeTe film in an amorphous state is measured by using glass plate on which the thin (GeTe) film is deposited, revealing that a complex refractive index (n+ki) is 4.15+0.98i at a wavelength of 780 nm. Then, the thin film is subjected to a heat treatment at 300° C. for 5 minutes in an inert gas atmosphere to form a crystalline state. The optical constant of the resulting thin film is measured, revealing that n+Ki is 6.37+3.97i. Accordingly, the thin film of GeTe in the amorphous state has an extinction coefficient k of 1 or less and the change of the refractive index n is one and half times as large or more at a wavelength of 780 nm.

This example of the optical recording medium includes a substrate 1 made of a polycarbonate resin (PC, refractive index; 1.58), a transparent layer 2 made of a mixture containing zinc sulfide and a silicon dioxide (ZnS-SiO$_2$, mol ratio; 4:1, refractive index; 2.10), a recording thin film layer 3 made of GeTe, and a transparent layer 4 made of ZnS-SiO$_2$. These layers are deposited in this order by magnetron sputtering.

The layers 2, 3, and 4 are deposited to have a thickness of $t_2$, $t_3$, and $t_4$, respectively. A reflective layer 5 made of gold (Au, refractive index; 0.18+4.64i) is deposited on the resulting substrate 1 by DC sputtering to have a thickness of $t_5$ and a protective layer 6 made of a resin material having the same refractive index as that of the substrate 1 is further coated thereon, whereby the recording medium is formed.

The reflectance Ra and Rc, and the reflectance change thereof $\Delta R$ (=Rc-Ra) of the amorphous state and the crystalline state of the recording thin film; the absorbance Aa and Ac, and the absorbance change thereof $\Delta A$ (=AC-Aa) of the recording thin film; and the optical phase shift $\Delta\phi$ of the reflected light, are calculated by changing the thicknesses $t_2$, $t_3$, $t_4$, and $t_5$.

The reflectance, absorbance, and optical phase of the reflected light can be calculated by a matrix method by measuring the complex refractive index and the film thickness of each layer (see "Wave Optics", Chapter III, Hiroshi Kubota, Iwanami Shyoten Publishers, (1971), or Leo Levi, Applied Optics II. p. 62–72, John Wiley & Sons, Inc., (1980)). Further, the reflectance R is defined as a ratio of light reflected by the top surface of substrate to light incident into the substrate, and the optical phase is obtained depending on the optical phase on the interference between the substrate 1 and the transparent layer 2, under the condition that the substrate 1 and the protective layer 6 have an infinite thickness. In this case, effects of interface between the substrate and air, and protective layer and air are ignored. Since an optical phase $2\pi$ corresponds to a wavelength $\lambda$, the optical length is shown in the range of 0 to $\lambda/2$ in the following diagrams (For example, the configuration of the optical length of 0 to $\lambda/2$ is the same as that of the optical wavelength of $\lambda/2$ to $\lambda$).

Figure 2:
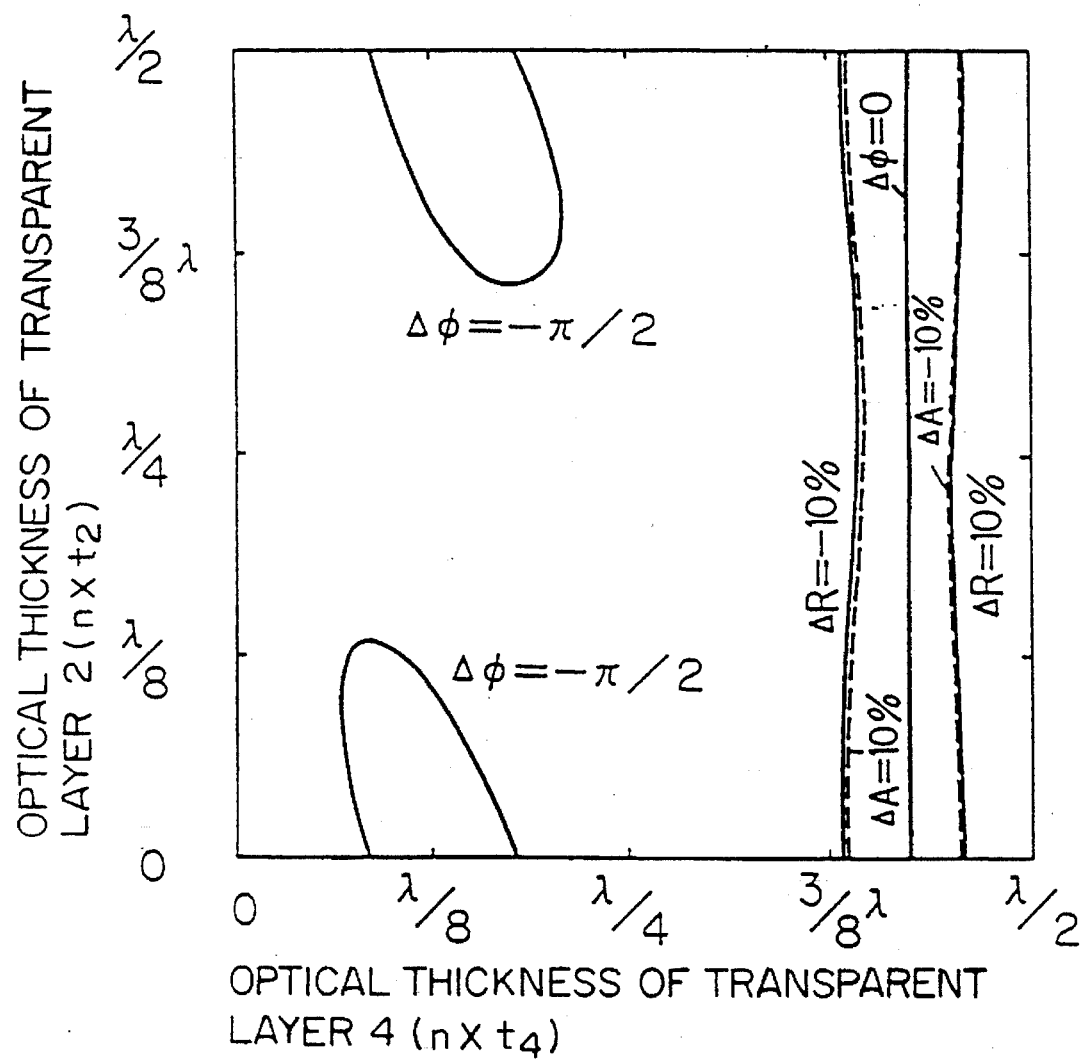
FIGS. 2 to 16 show characteristic diagrams describing calculated results for achieving optimum regions in examples of the present invention.

FIG. 2 shows the optical phase shift $\Delta\phi$ the absorbance change $\Delta A$, and the reflectance changed $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 5 nm and 50 nm, respectively. In FIG. 2, the thicknesses $t_2$ and $t_4$ are represented as an optical thickness (refractive index X physical thickness) with respect to the wavelength $\lambda$. Since the refractive index n of the transparent layers 2 and 4 is 2.1, the $\lambda/2$ corresponds to 185.7 nm (=780÷2.1÷2). In FIG. 2, in a region between $\Delta A$=10% line (broken line) and $\Delta A$=–10% line (broken line), the absolute value of $\Delta A$ is 10% or less. In a region between $\Delta R$=10% line (thin solid line) and $\Delta R$=–10% line (thin solid line), the absolute value of $\Delta R$ is 10% or less. Further, a region between $\Delta\phi$=–$\pi/2$ curve (thick solid line) and $\Delta\phi$=–$3\pi/2$ curve (thick solid line) has a large optical phase shift. Accordingly, under the condition that $t_3$=5 nm and $t_5$=50 nm, a region having a small absorption change also has a small reflectance change and a small optical phase shift. Thus, there is no region in which overwriting can be conducted and recorded information is represented is reproduced based on an optical phase shift.

Figure 3:
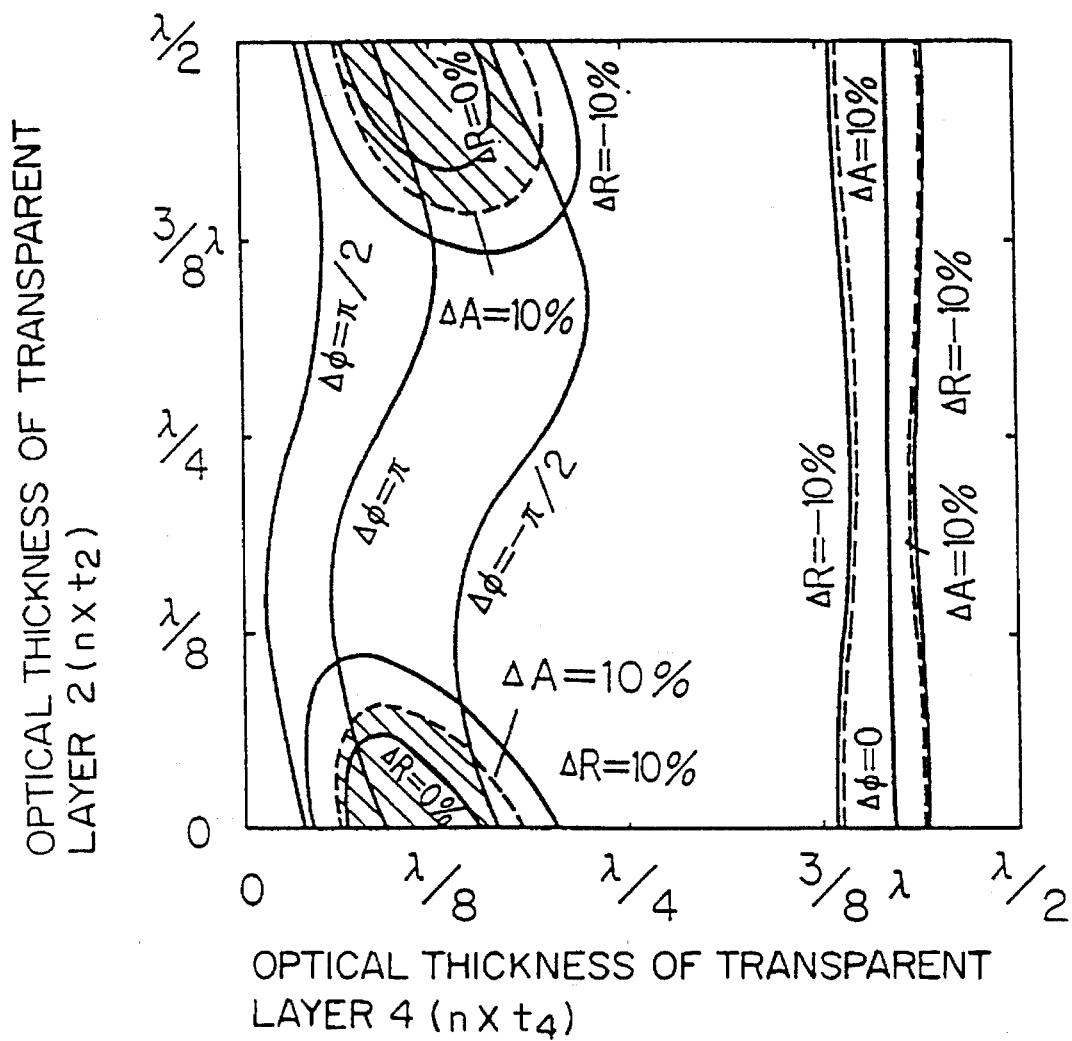

FIG. 3 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 10 nm and 50 nm, respectively. In the shaded portion, the absolute value of $\Delta A$ is 10% or less and $\Delta\phi$ is more than –$3\pi/2$ and less than –$\pi/2$, i.e., the absolute value of $\Delta\phi$ is large. Further, in the shaded portion, the absolute value of $\Delta R$ is 10% or less, and the absolute value of the reflectance (not shown) is approximately 20%.

Figure 4:
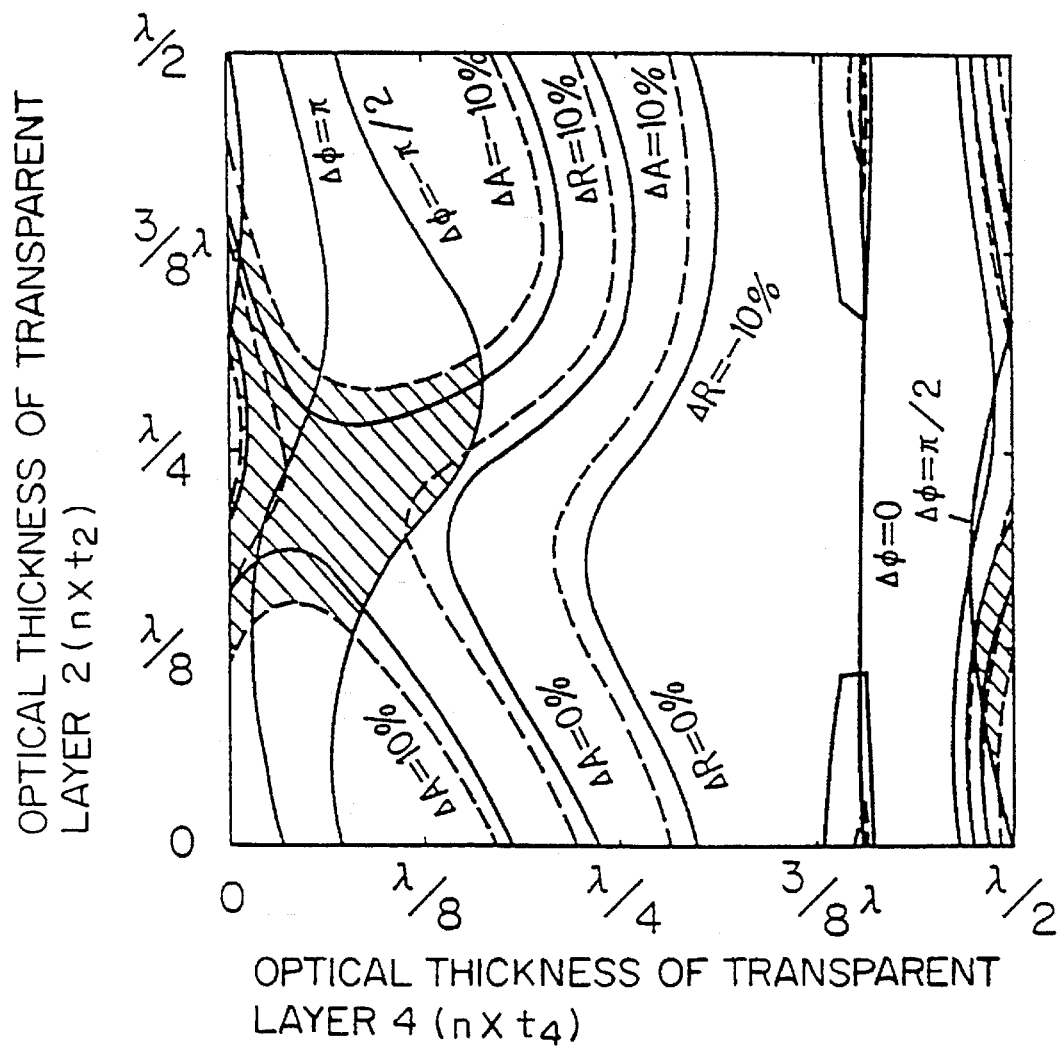

FIG. 4 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 20 nm and 50 nm, respectively. As is understood from FIG. 4, the shaded portion in which the absolute value of $\Delta A$ is 10% or less and $\Delta\phi$ is more than –$3\pi/2$ and less than –$\pi/2$ becomes quite large. Further, in the shaded portion, the absolute value of $\Delta R$ is 10% or less, and the absolute value of the reflectance (not shown) is approximately 25%.

Figure 5:
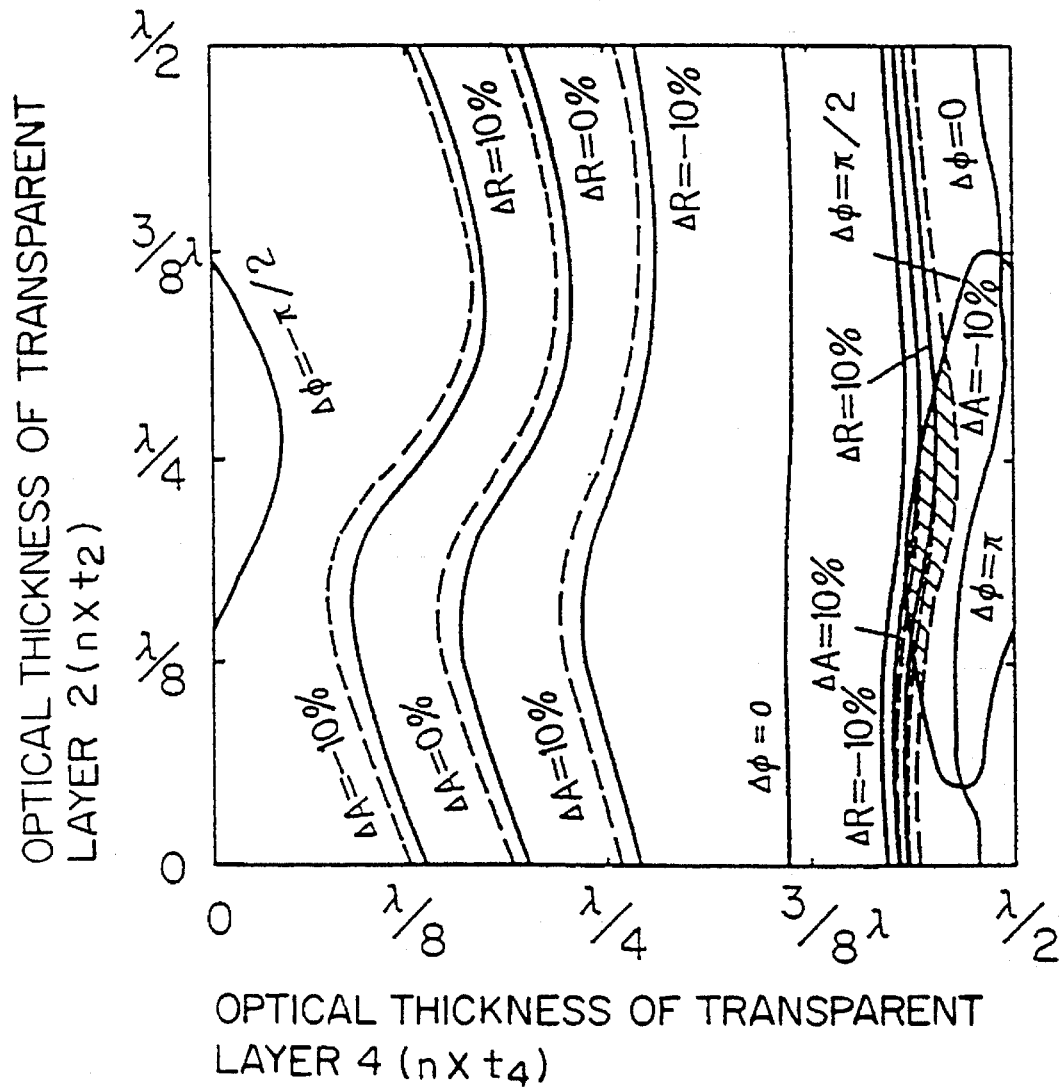

FIG. 5 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 35 nm and 50 nm, respectively. In the shaded portion, the absolute value of $\Delta A$ is 10% or less and the $\Delta\phi$ is more than –$3\pi/2$ and less then –$\pi/2$, i.e., the absolute value of $\Delta\phi$ is large. Further, in the shaded portion, the absolute value of $\Delta R$ is 10% or less, and the absolute value of the reflectance (not shown) is approximately 20%.

Figure 6:
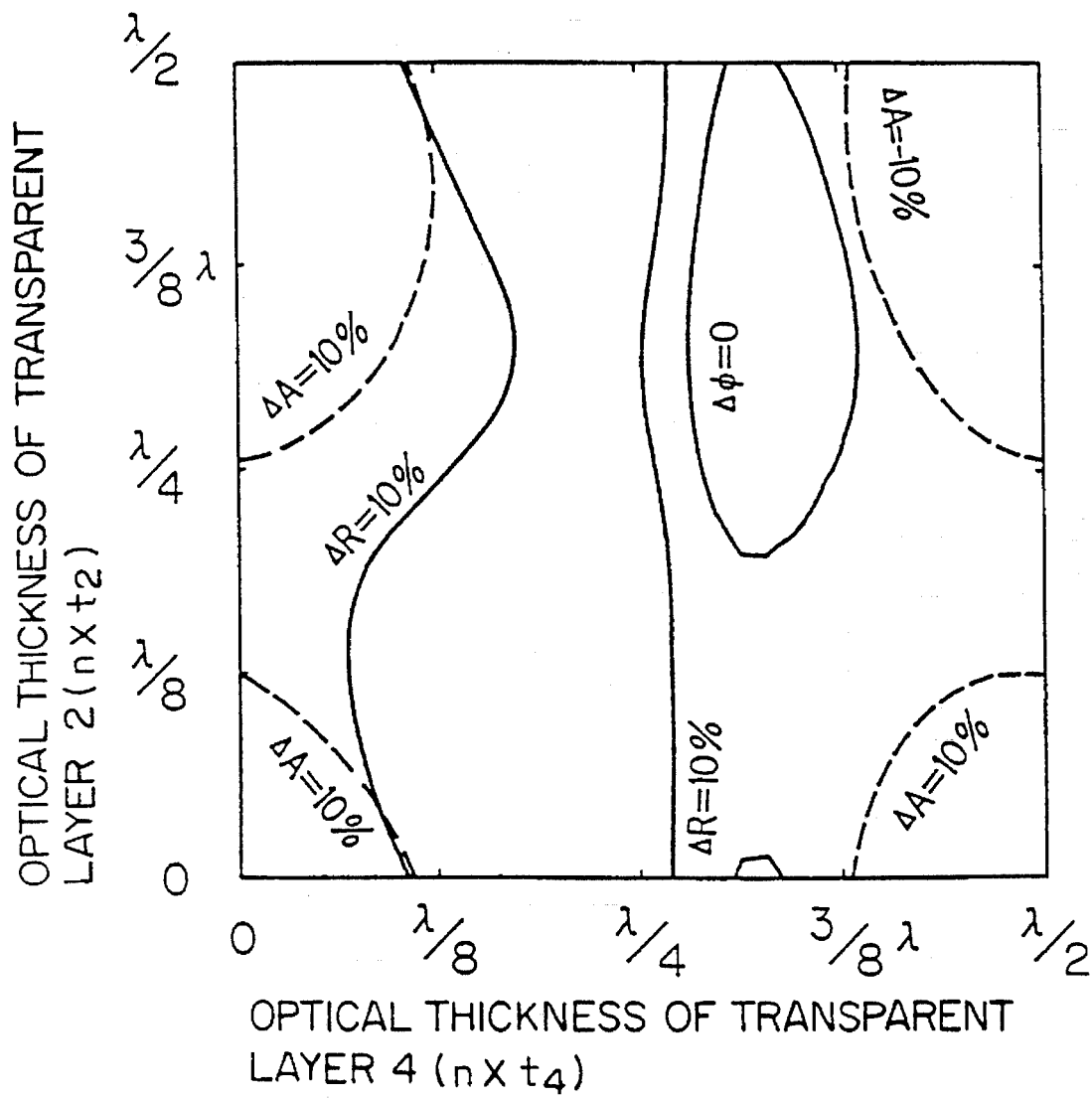

FIG. 6 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 40 nm and 50 nm, respectively. In this case, a region where the absolute value of $\Delta A$ is 10% or less is present; however, no region is present where $\Delta\phi$ is more than –$3\pi/2$ and less than –$\pi/2$. Further, the results show that under the condition that $t_5$=50 nm and $t_3$=40 nm or more, the structure in which the absorbance change ($\Delta A$) is small and the optical phase shift ($\Delta\phi$) is large cannot be realized.

Figure 7:
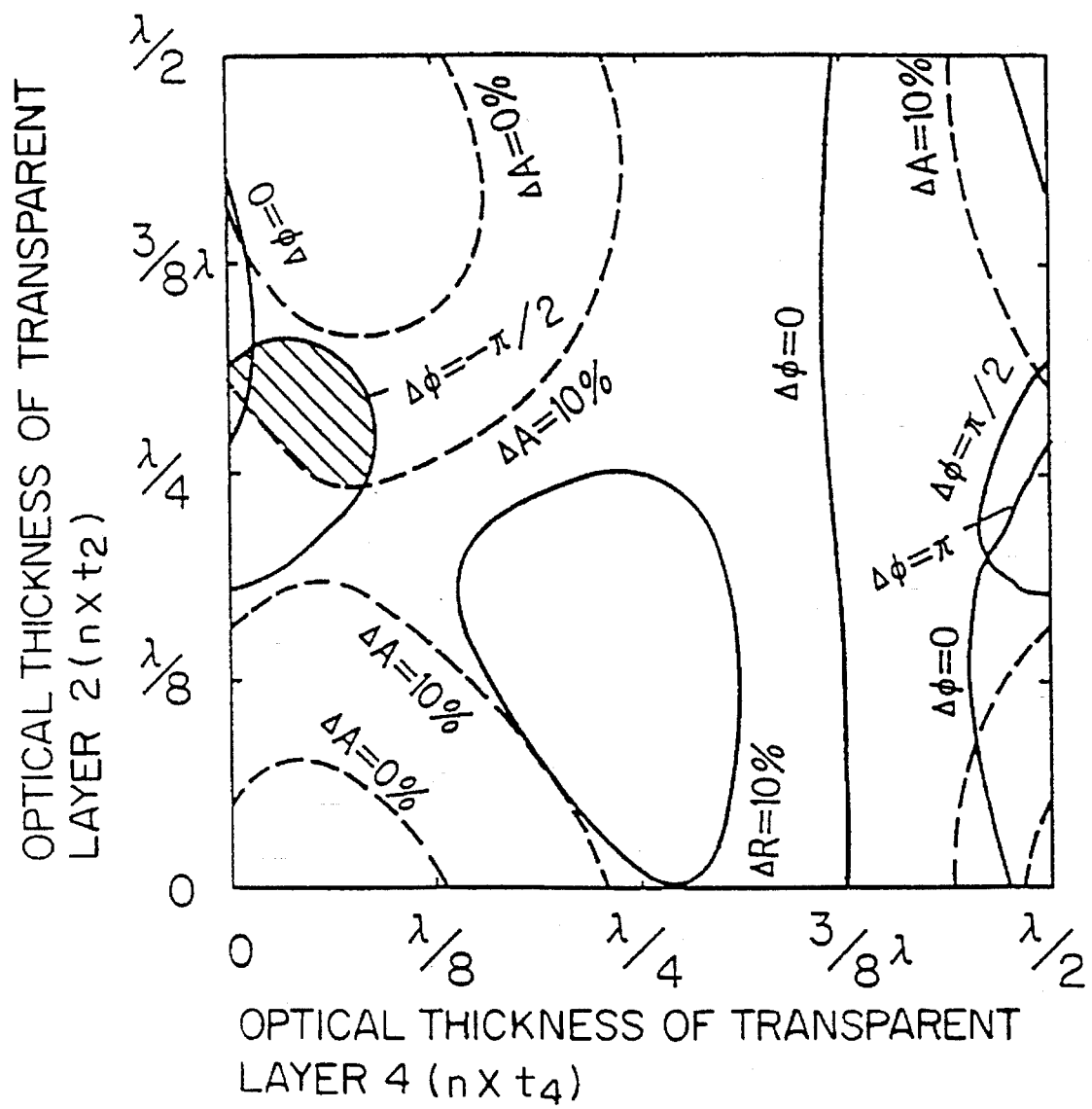

FIG. 7 shows the optical phase shift $\Delta\phi$, the absorbance change $\Delta A$, and the reflectance change $\Delta R$, of the reflected light, depending on the thicknesses $t_2$ and $t_4$ of the transparent layers and 4, under the condition that the wavelength $\lambda$, the thickness $t_3$ of the recording layer, and the thickness $t_5$ of the reflective layer are fixed at 780 nm, 20 nm and 10 nm, respectively. The shaded portion in which the absolute value of $\Delta A$ is 10% or less and $\Delta\phi$ is more than –$3\pi/2$ and less than –$\pi/2$ becomes quite large. In this case, since the reflective layer is thin (=$t_5$) and the transmittance thereof is large, a region where the absolute value of $\Delta R$ is 10% or less does not always coincide with the region where $\Delta A$ is small. The absolute value of the reflectance is approximately 25% in the non-recorded state and 7% or less in the recorded state.

In addition, the same calculation is conducted under the condition that $t_5$ is 10 nm and $t_3$ is further varied. This results in that the above-mentioned results cannot be obtained in the case of $t_3$ of 10 nm or less, or $t_3$ of 30 nm or more. Thus, since the above-mentioned results depend on the thickness of the reflective layer, the thickness thereof should be appropriately selected.

The following experiment is conducted, based on the above-mentioned results.

On the substrate 1 made of a polycarbonate resin plate (PC, refractive index; 1.58), the transparent layer 2 made of a dielectric mixture containing zinc sulfide and silicon dioxide ($ZnS$-$SiO_2$), the recording thin film layer 3 made of GeTe, the transparent layer 4 made of $ZnS$-$SiO_2$, and the reflective layer 5 made of gold (Au) are deposited by magnetron sputtering. Further, the protective layer 6 made of the same PC disk as that of the substrate 1 is sticked to the resulting substrate 1 with an adhesive, thereby forming an optical recording medium.

The substrate 1 has a thickness of 1.2 mm and diameter of 130 mm. The respective thickness of the transparent layers 2 and 4, the recording layer 3, and the reflective layer 5 is 46 nm ($\lambda/8$), 81 nm ($7\lambda/32$), 20 nm, and 50 nm.

The optical recording medium is rotated so that a focused laser beam moves on the surface of the recording thin film layer 3 at a linear velocity of 8 m/sec. Such a focused laser beam is obtained by employing a semiconductor laser device (laser diode) for emitting a laser beam having a wavelength of 780 nm and a lens system having a numerical aperture of 0.55. Initially, the surface of the recording thin film layer 3 is irradiated with a laser beam having a continuous output of 10 mw so that the recording thin film on the track is uniformly crystallized.

The track is irradiated with the laser beam having a continuous output of 1 mW (reproducing power), and the reflected light thereof is detected by a photodetector, revealing that the reflectance of the recording thin film is 25%. In a writing mode, the track is irradiated with a laser beam modulated between the recording power (22 mW) and the erasing power (11 mW), with the single frequency of 5 MHz by 50% of the modulation degree (duty), so that the recording thin film layer 3 partially becomes amorphous for recording information. Therefore, reproduction light of 1 mW is radiated to the recording thin film layer 3, and the reflected light thereof is detected by the photodetector, whereby signals of 1 MHz are reproduced. The reproduced signals are measured by a spectrum analyzer, revealing that the CN ratio (carrier to noise ratio) is 54 dB (resolution band width; 30 kHz, hereinafter, the same as above). The track is further irradiated with a laser beam modulated between the recording power (22 mW) end the erasing power (11 mW), with the single frequency of 2 MHz by 50% of the modulation degree (duty), thereby conducting overwrite recording. Since portions irradiated with the recording power become amorphous, and portions irradiated with the erasing power become crystalline, the marks for recording which have already formed are erased and new marks are formed. The reproduced signals are measured in the same conditions with the same reproducing power, revealing that the CN ratio of the signals of 2 MHz is 55 dB. Further, an element of the frequency of 5 MHz has the CN ratio of 16 dB. This shows that the signals of 5 MHz which have already recorded are reduced by 38 dB. In general, the difference between the CN ratio of the recorded signals in the recorded state and the CN ratio of the recorded signals erased in the erased state is defined as the erase index. In this case, the erasability is 38 dB. In general, the erasability of 26 dB or more is enough for practical use. Accordingly, as is understood from the above-mentioned results, the optical recording medium of this example has a high reflectance and excellent overwrite characteristics, the medium being sufficient for practical use.

EXAMPLE 2

Configurations of the second example of the present invention is substantially the same as that of the first example of the present invention. In this example, a compound $Sb_2Se_3$ containing antimony (Sb) and selenium (Se) is used as a material of the recording thin film 3.

A recording film made of $Sb_2Se_3$ can be formed in an amorphous state on a substrate by DC sputtering method using a target containing Sb and Se. The optical constant of the recording thin film 3 in an amorphous state is measured by using a glass plate on which the above-mentioned $Sb_2Se_3$ film is vapor-deposited, revealing that a complex refractive index (n+ki) is 3.00+0.15i at a wavelength of 780 nm. Then, the thin film is subjected to a heat treatment at 300° C. for 5 minutes in an inert gas atmosphere to form a crystalline state. The optical constant of the resulting thin film is measured, revealing that n+ki is 4.70+0.70i.

The example of the optical recording medium includes a substrate i made of a polycarbonate resin (PC, refractive index; 1.58), a transparent layer 2 made of a mixture containing zinc sulfide and a silicon dioxide ($ZnS$-$SiO_2$, mol ratio; 4:1, refractive index; 2.10), a recording thin film layer 3 made of GeTe, and a transparent layer 4 made of $ZnS$-$SiO_2$. These layers are deposited in this order by magnetron sputtering.

The layers 2, 3, and 4 are deposited to have a thickness of $t_2$, $t_3$, and $t_4$, respectively. A reflective layer 5 made of gold (Au, refractive index; 0.18+4.64i) is deposited on the resulting substrate 1 by DC sputtering to have a thickness of $t_5$ and a protective layer 6 made of a resin material having the same refractive index as that of the substrate 1 is further coated thereon, whereby the recording medium is formed.

The reflectance Ra and Rc, and the reflectance change thereof $\Delta R$ (=Rc-Ra) of the amorphous state and the crystalline state of the recording thin film; the absorbance Aa and Ac, and the absorbance change thereof $\Delta A$ (=Ac-Aa) of the recording thin film layer; and the optical phase shift $\Delta\phi$ of the reflected light, are calculated in the same way as in Example 1 by changing the thicknesses $t_2$, $t_3$, $t_4$, and $t_5$.

Figure 8:
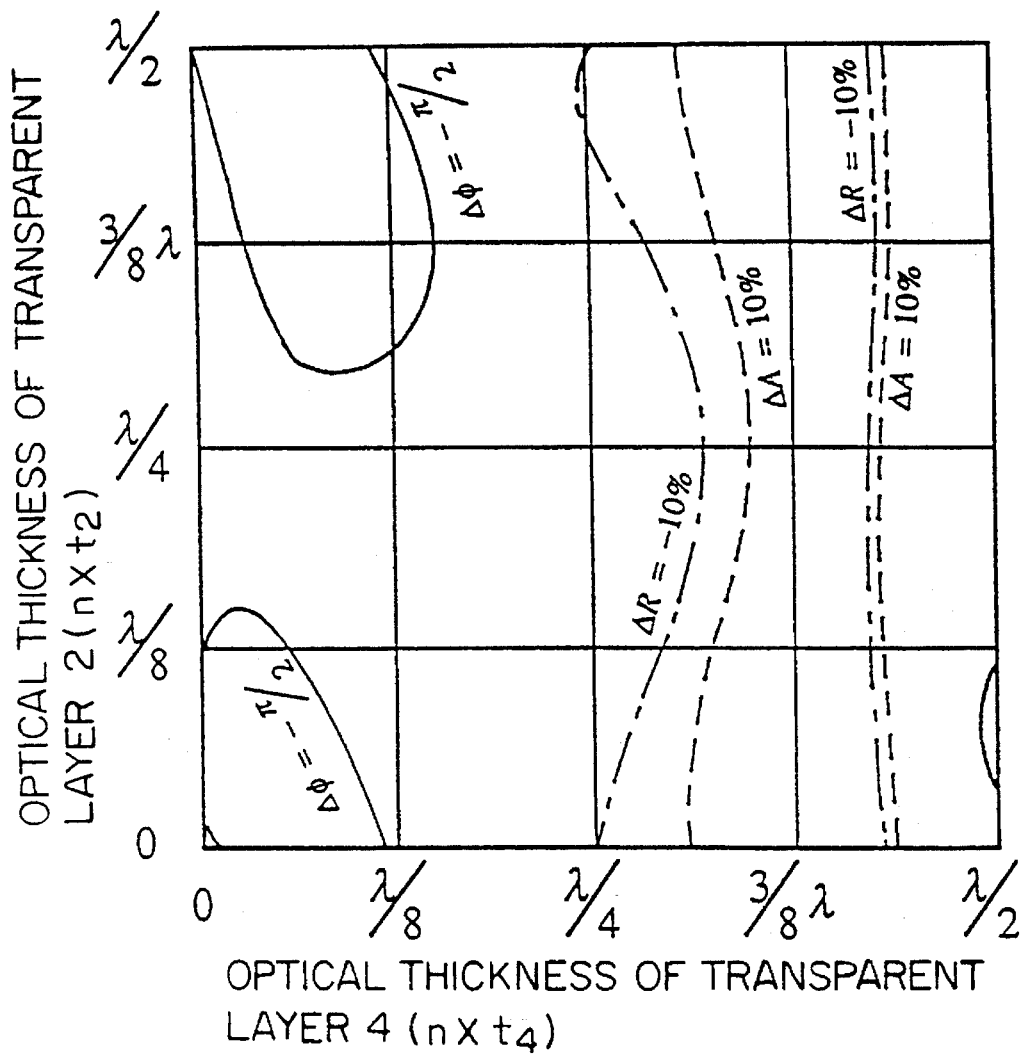

FIG. 8 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 20 nm and 50 nm, respectively. In FIG. 8, in a region between $\Delta A=10\%$ lines (broken lines), the absolute value of $\Delta A$ is 10% or less. Further, in a region between $\Delta R=-10\%$ lines (dash-dot lines), the absolute value of $\Delta R$ is $-10\%$ or more. Moreover, a region within $\Delta\phi=-\pi/2$ curve (solid lane), $\Delta\phi$ is smaller than $-\pi/2$. Accordingly, under the condition that $t_3=20$ nm and $t_5=50$ nm, a region having a small absorbance change also has small reflectance change and a small optical phase shift. Thus, there is no region in which overwriting can be conducted and recorded information is reproduced based on an optical phase shift.

Figure 9:
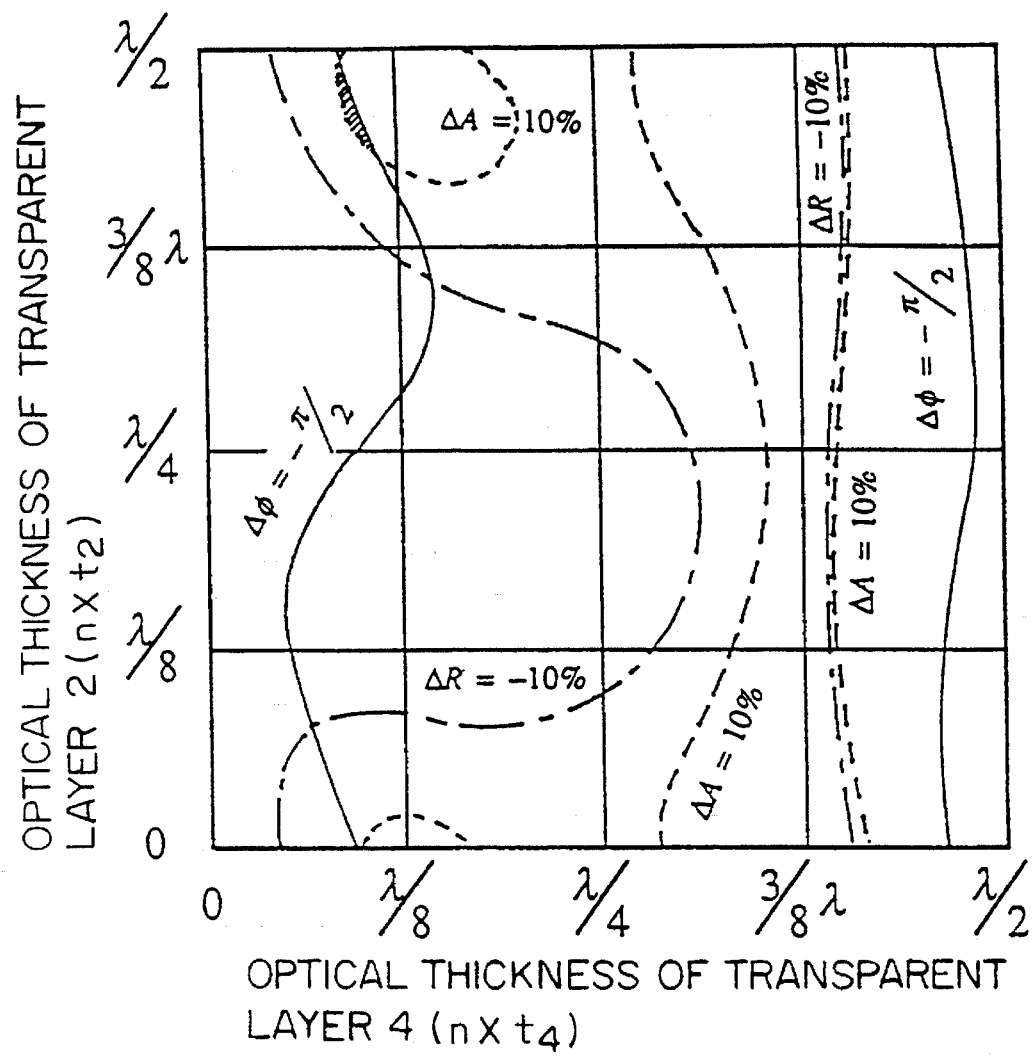

FIG. 9 shows the optical phase shift $\Delta\phi$, the absorbance change $\Delta A$, and the reflectance change $\Delta R$, of the reflected light, depending on the thicknesses $t_2$ and $t_4$ of the transparent layers 2 and 4, under the condition that the wavelength $\lambda$, the thickness $t_3$ of the recording layer, and the thickness $t_5$ of the reflective layer are fixed at 780 nm, 30 nm and 50 nm, respectively. In the shaded portion, ΔA is 10% or less and Δφ is less than −π/2, i.e., the absolute value of Δφ is large. In this portion, ΔR is −10% or more and the absolute value of the reflectance (not sown) is approximately 55%.

Figure 10:
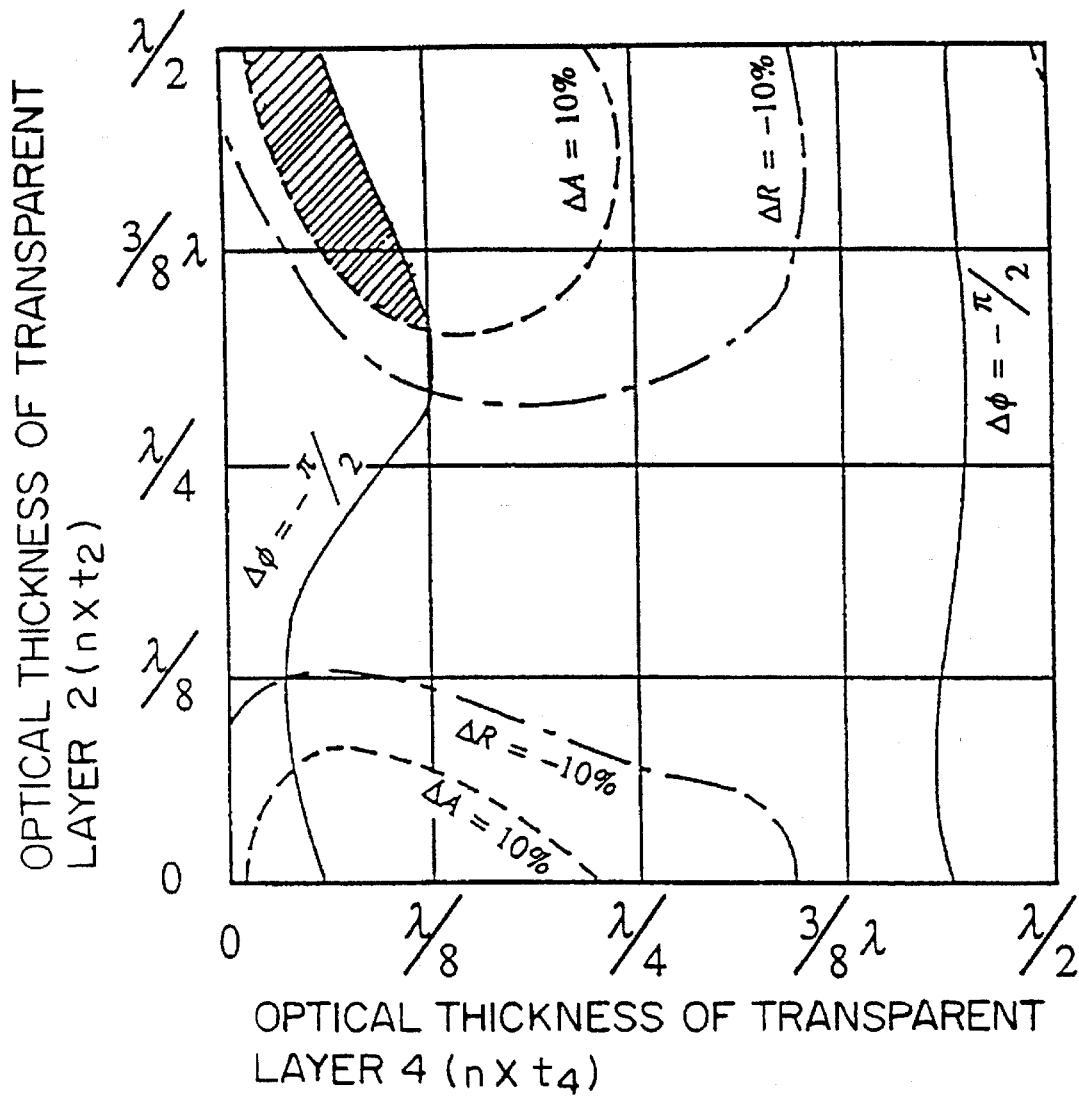
Figure 11:
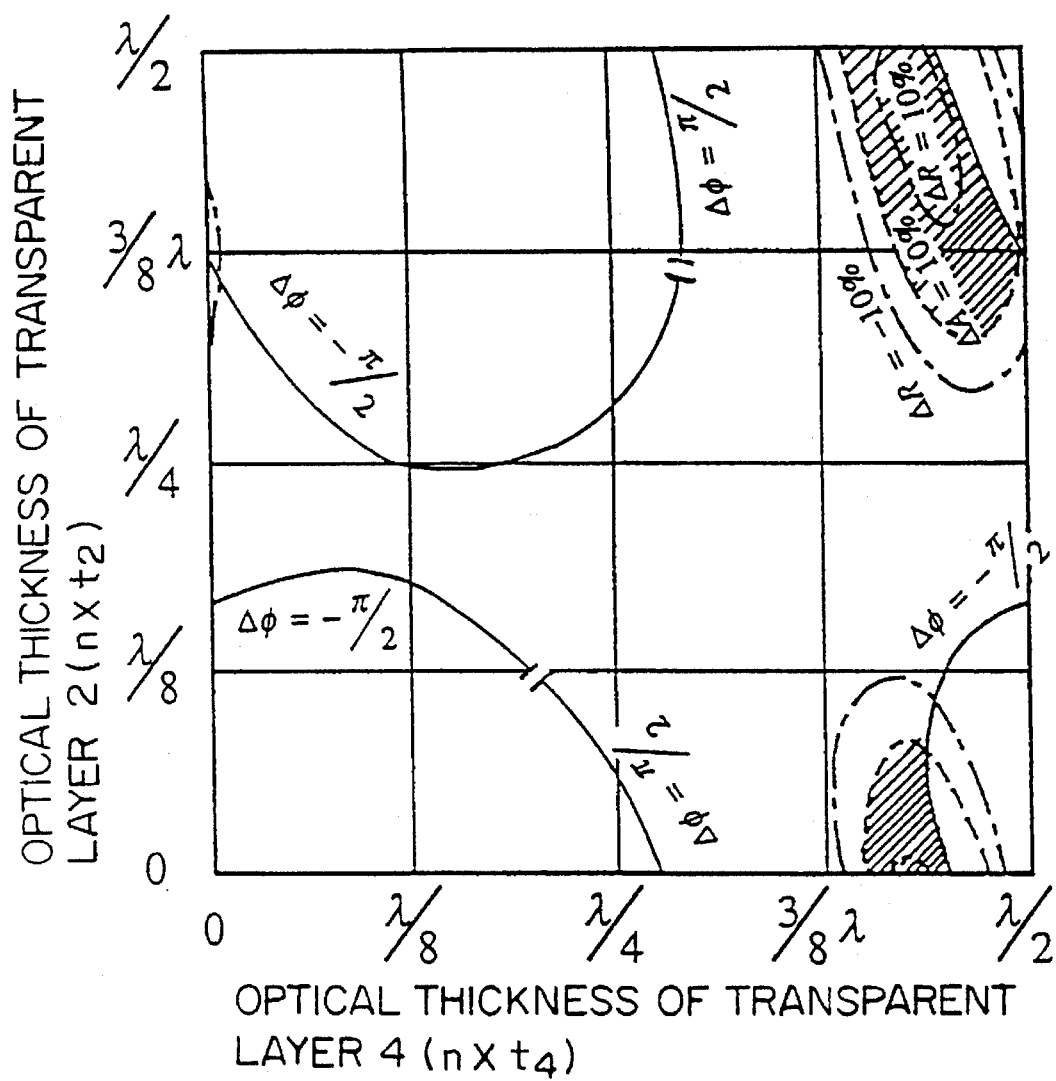
Figure 12:
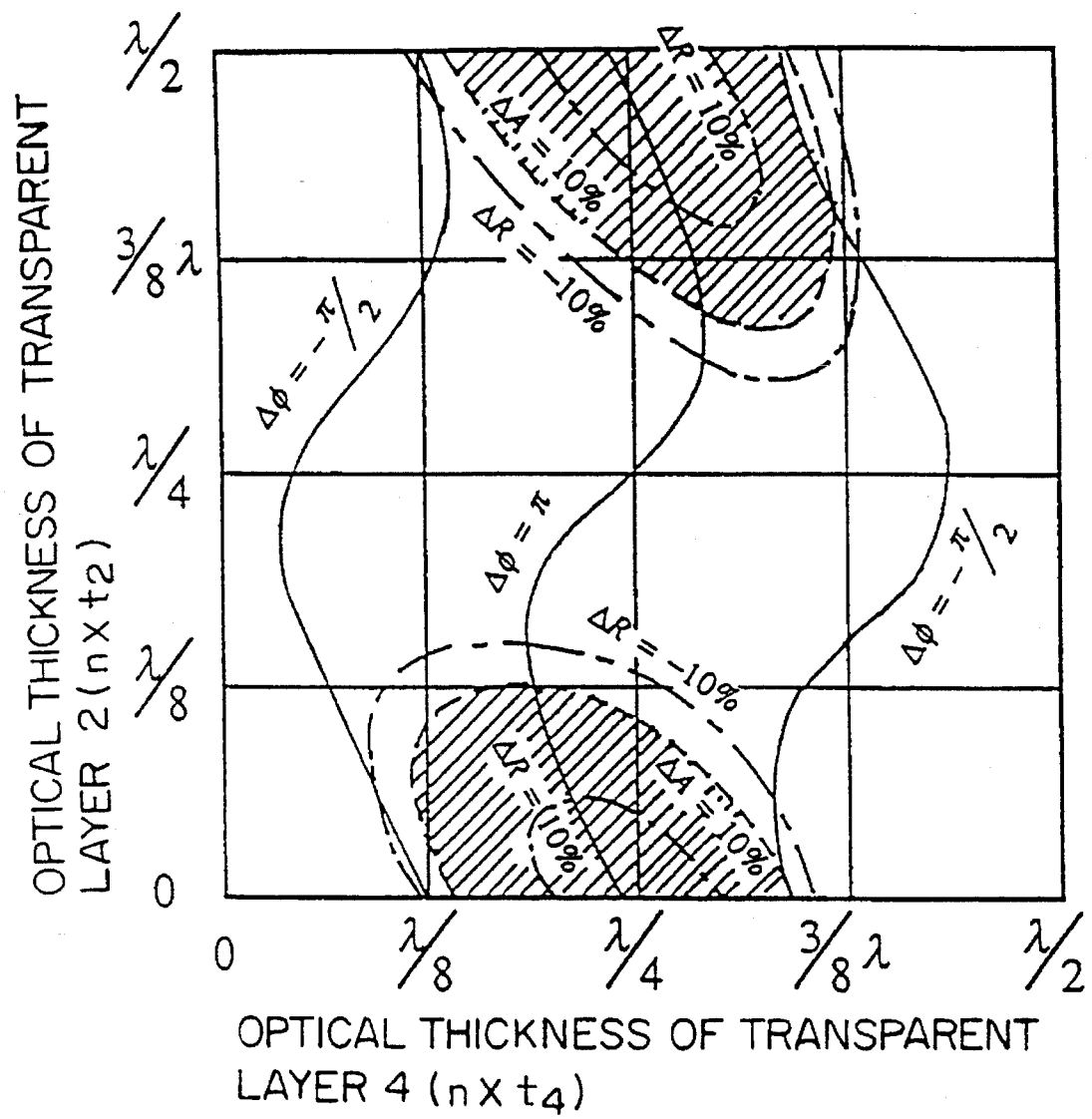
Figure 13:
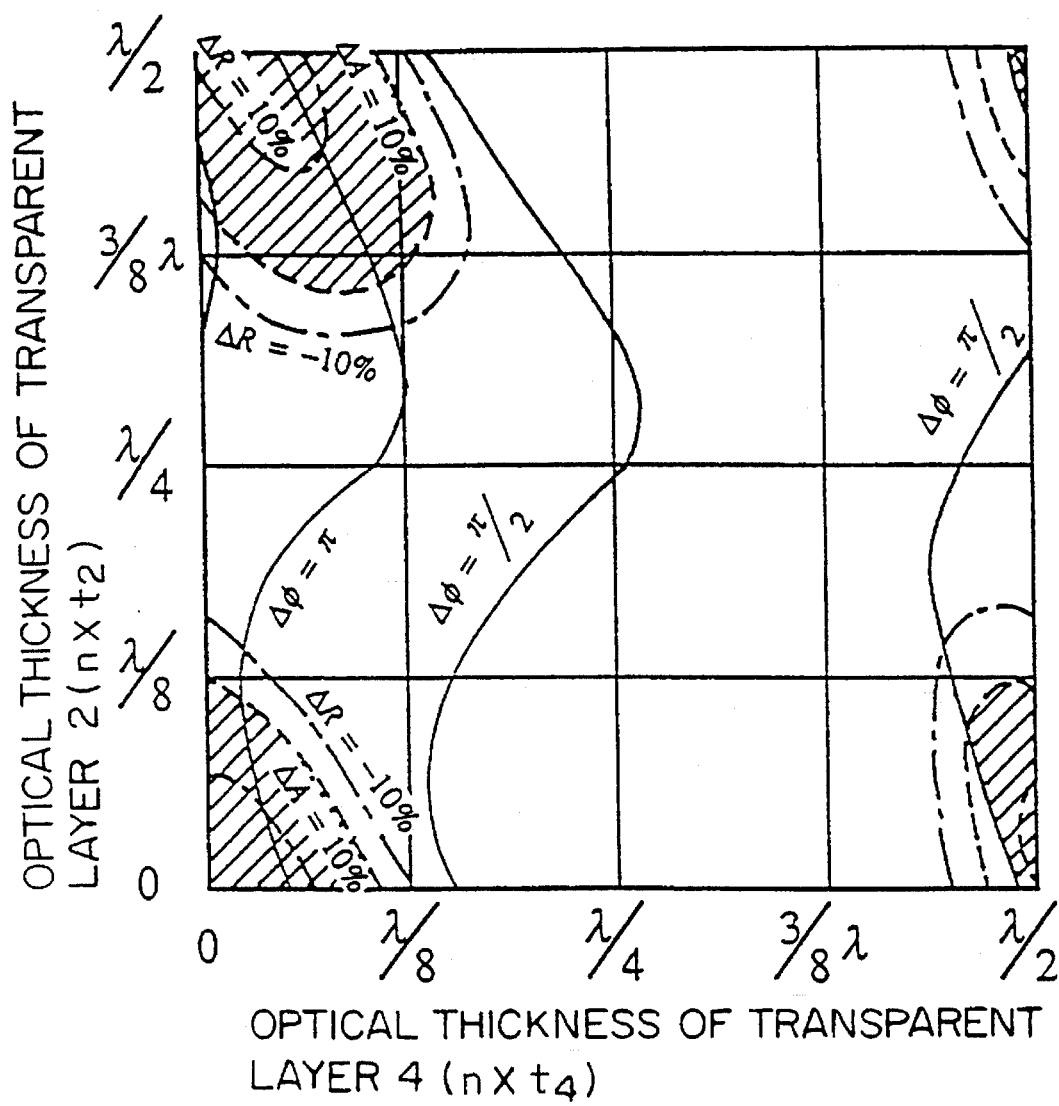
Figure 14:
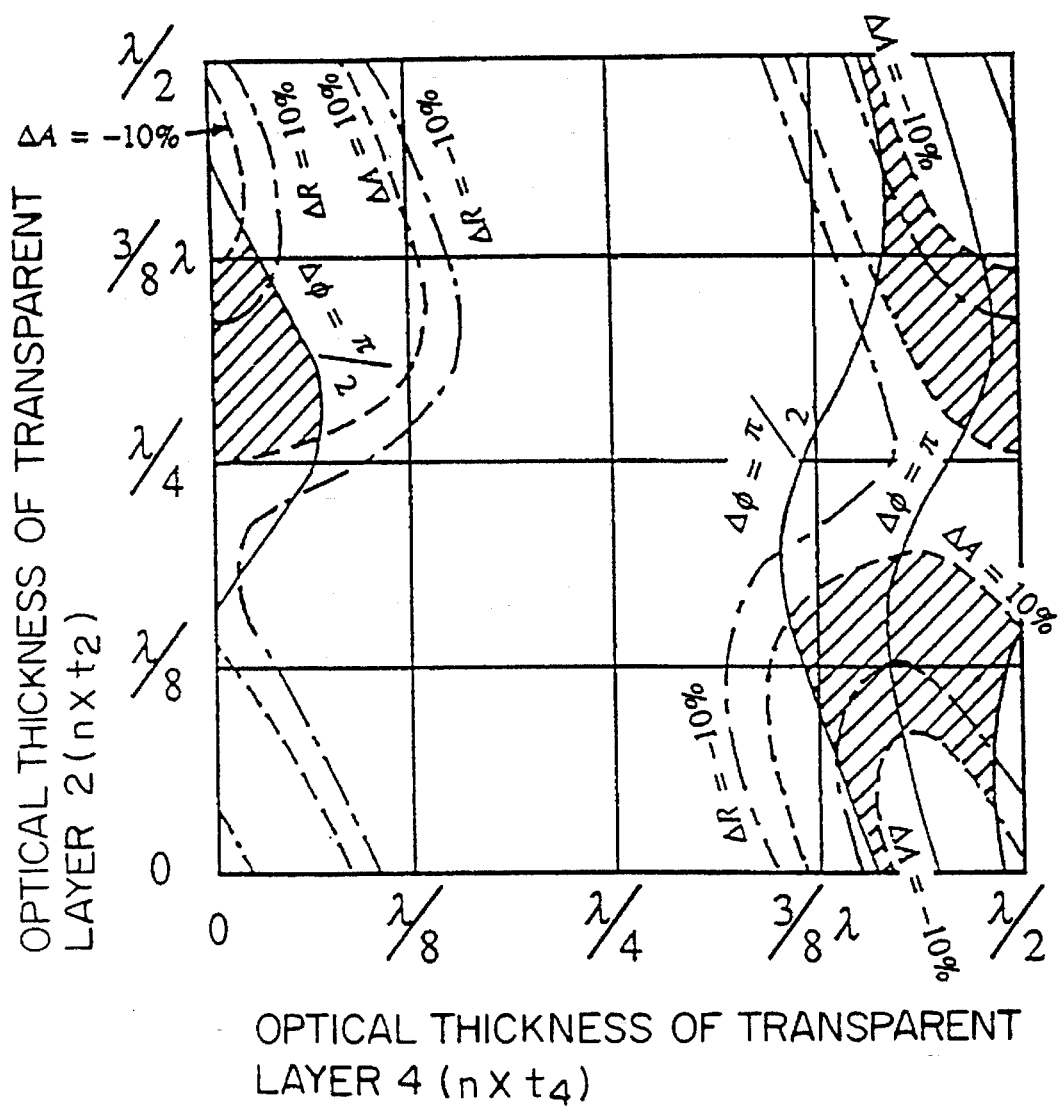

FIG. 10 shows the optical phase shift Δφ, the absorbance change ΔA, and the reflectance change ΔR, of the reflected light, depending on the thicknesses $t_2$ and $t_4$ of the transparent layers and 4, under the condition that the wavelength λ, the thickness $t_3$ of the recording layer, and the thickness $t_5$ of the reflective layer are fixed at 780 nm, 40 nm and 50 nm, respectively. As is understood from FIG. 10, the shaded portion in which ΔA is 10% or less and Δφ is less than −π/2 becomes quite large. Further, in the shaded portion, ΔR is −10% or more, and the absolute value of the reflectance (not shown) is approximately 45%.

FIGS. 11, 12, 13, and 14 show the optical phase shift Δφ, the absorbance change ΔA, and the reflectance change ΔR, of the reflected light obtained in the same manner as the above, under the condition that $t_5$ is 50 nm in each case; and $t_3$ is 80 nm, 120 nm, 160 nm, and 320 nm, respectively. In each case, the shaded portion has ΔA of 10% or less, and Δφ in the range of more than π/2 to π (maximum). Further, the shaded portion has ΔR in the range of −10% or more to 10% or less. The absolute value of the reflectance is 40%, 40%, 20%, and 10%, respectively. This shows that as the thickness of the recording thin film layer is increased, the absolute value of the reflectance is decreased. In contrast, the absolute value of the absorbance is increased as the thickness thereof is increased.

Figure 15:
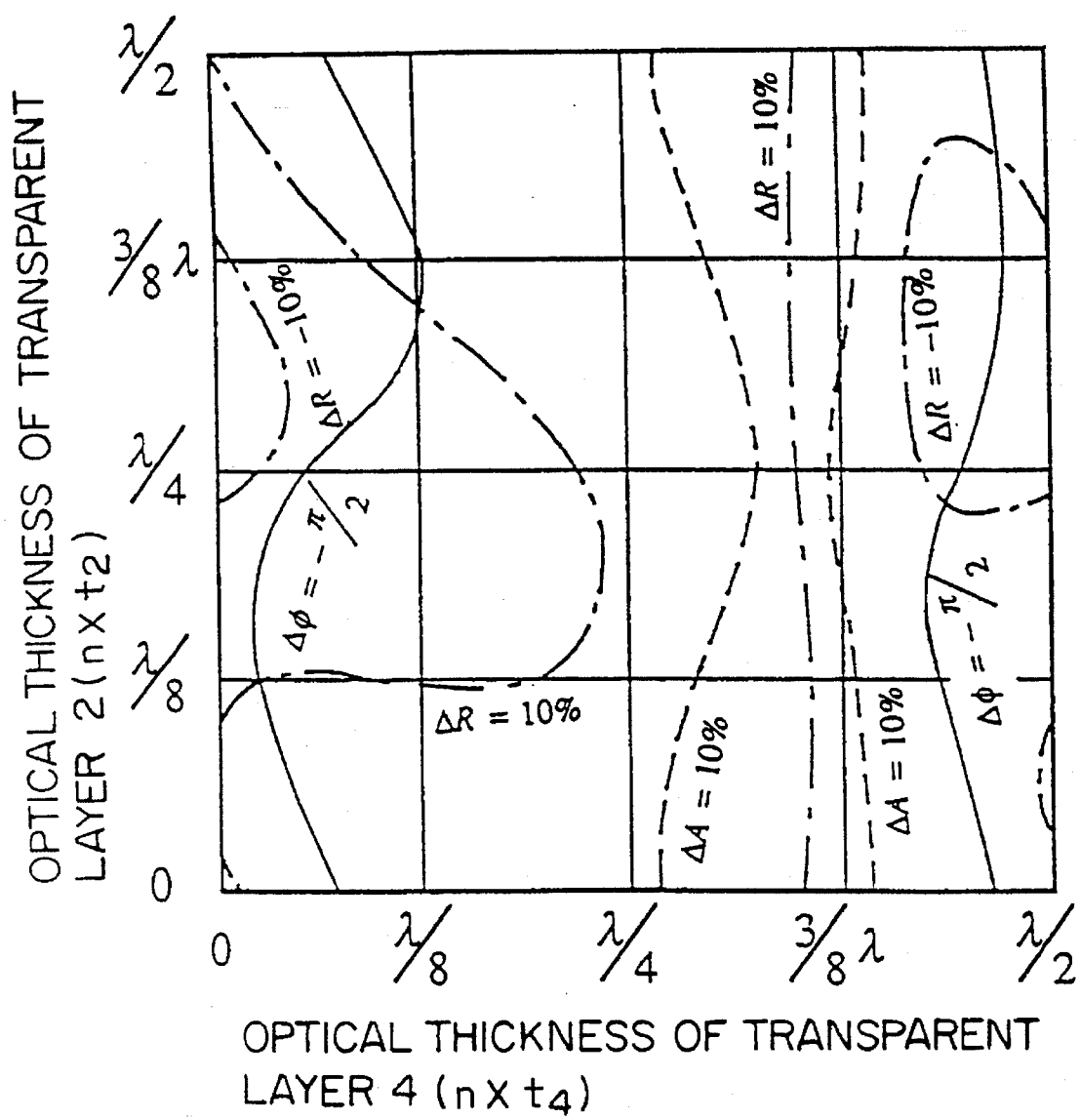
Figure 16:
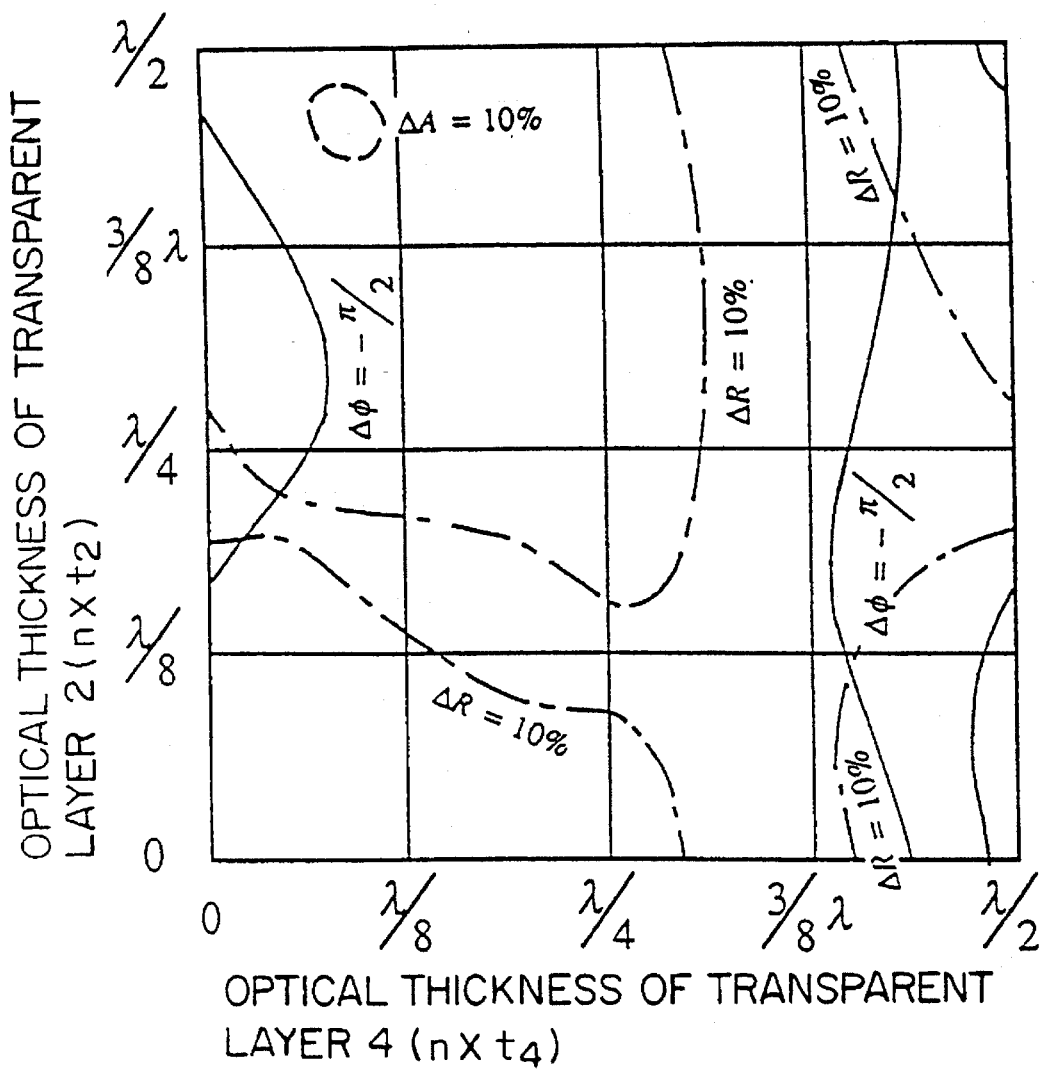

FIGS. 15 and 16 show the optical phase shift Δφ, the absorbance change ΔA, and the reflectance change ΔR, of the reflected light obtained in the same manner as the above, under the condition that $t_5$ is 10 nm, and $t_3$ is 20 nm and 40 nm, respectively. In each case, the same results as those of the above cannot be obtained. Accordingly, the thickness of the reflective layer should be appropriately selected.

The following experiment is conducted, based on the above-mentioned results. On the substrate 1 made of a polycarbonate resin plate (PC, refractive index; 1.58), the transparent layer 2 made of a dielectric mixture containing zinc sulfide and silicon dioxide (ZnS-SiO$_2$), the recording thin film layer 3 made of Sb$_2$Te$_3$, the transparent layer 4 made of ZnS-SiO$_2$ and the reflective layer 5 made of gold (Au) are deposited by magnetron sputtering. Further, the protective layer 6 made of the same PC disk as that of the substrate 1 is sticked to the resulting substrate 1 with an adhesive, thereby forming an optical recording medium. The substrate 1 has a thickness of 1.2 mm and diameter of 130 mm. The respective thickness of the transparent layers 2 and 4, the recording layer 3, and the reflective layer 5 is 197 nm (17λ/32), 163 nm (7λ/16), 40 nm, and 50 nm.

The recording medium is rotated so that a focused laser beam moves on the surface of the recording thin film layer 3 at a linear velocity of 1.3 m/sec. Such a focused laser beam is obtained by employing a semiconductor laser device for emitting a laser beam having a wavelength of 780 nm and a lens system having a numerical aperture of 0.55. Initially, the surface of the recording thin film is irradiated with a laser beam having a continuous output of 8.5 mw so that the recording thin film on the track is uniformly crystallized.

The track is irradiated with the laser beam having a continuous output of 1 mW (reproducing power), and the reflected light thereof is detected by a photodetector, revealing that the reflectance of the recording thin film is 45%. In a writing mode, the track is irradiated with a laser beam modulated between the recording power (19 mW) and the erasing power (9 mW), with the single frequency of 1 MHz by 50% of the modulation degree (duty), so that the recording thin film partially becomes amorphous for recording information. Thereafter, reproduction light of 1 mW is radiated to the recording thin film, and the reflected light thereof is detected by the photodetector, whereby signals of 1 MHz are reproduced. The reproduced signals are measured by a spectrum analyzer, revealing that the CN ratio is 52 dB (frequency analyzing ability; 10 kHz, hereinafter, the same as above).

The track is further irradiated with a laser beam modulated between the recording power (15 mW) and the erasing power (8 mW), with the unifrequency of 200 kMz by 50% of the modulation degree (duty), thereby conducting overwrite recording. Since portions irradiated with the recording power become amorphous, and portions irradiated with the erasing power become crystalline, the marks for recording which have already formed are erased and new marks are formed. The reproduced signals are measured under the same conditions with the same reproducing power, revealing that the CN ratio of the signals of 200 kHz is 53 dB. Further, an element of the frequency of 1 MHz has the CN ratio of 18 dB. That is, the erasability is 33 dB. Accordingly, as is understood from the above-mentioned results, the optical recording medium of this example has a high reflectance and excellent overwrite characteristics, sufficient for practical use.

As is understood from the above-mentioned examples, the thicknesses of the first transparent layer 2, recording thin film layer 3, second transparent layer 4, and reflective layer 5 are selected so that the optical phase of reflected light which is incident is changed, and absorbance change of the recording thin film layer is made small after structural phase is changed, whereby a recording medium in which temperature rise is not changed even with a high reflectance can be obtained.

Various other modification will be apparent to and can be readily made by those skilled in the art without departing from The scope and spirit of this invention. Accordingly, it is no% intended that the scope of the claims appended hereto be limited to the description as set forth herein, but rather that the claims be broadly construed.

What is claimed is:

1. An optical recording medium comprising:

a substrate, and a recording film formed on the substrate, said recording film receiving a laser beam for recording and taking either a first structural state or a second structural state according to an intensity of the laser beam for recording; and said recording film receiving a laser beam for reproducing which is defined by an amplitude and an optical phase, and locally changing the optical phase of the laser beam for reproducing according to the structural state to reproduce stored information, thereby changing an intensity of the laser beam for reproducing, wherein an optical absorbance of the recording film in the first structural state is substantially equal to that of the recording film in the second structural state, and a complex refractive index of the recording film in the first structural state is substantially different from that of the recording film in the second structural state, an amplitude of the laser beam for reproducing is substantially maintained at a fixed value while the optical phase of the laser beam for reproducing is changed according to the structural state of the recording film, and at least one of extinction coefficients (k) of the recording film in the first structural state and that of the recording film in the second structural state is 1.0 or less; and a refractive index (n) of the recording film in the first structural state is one and a half times as large as that of the recording film in the second structural state.

2. An optical recording medium comprising:

a substrate, and a recording film formed on the substrate, the recording film receiving a laser beam for recording and taking either a first structural state or a second structural state according to an intensity of the laser beam for recording; and the recording film receiving a laser beam for reproducing which is defined by an amplitude and an optical phase, and locally changing the optical phase of the laser beam for reproducing according to the structural state to reproduce stored information, thereby changing an intensity of the laser beam for reproducing, wherein the recording film includes a first transparent layer, a structural phase changeable recording layer formed on the first transparent layer, and a second transparent layer formed on the structural phase changeable recording layer, optical thicknesses of the first and second transparent layers and the structural phase changeable recording layer are selected so that an optical absorbance of the structural phase changeable recording layer in the first structural state and that of the structural phase changeable recording layer in the second structural state are substantially equal to each other, and a complex refractive index of the structural phase changeable recording layer in the first structural state and that of the structural phase changeable recording layer in the second structural state are substantially different from each other, and an amplitude of the laser beam for reproducing is substantially maintained at a fixed value while the optical phase of the laser beam for reproducing is changed according to the structural state of the structural phase changeable recording layer, and at least one of extinction coefficients (k) of the structural phase changeable recording layer in the first structural state and that of the structural phase changeable recording layer in the second structural state is 1.0 or less; and a refractive index (n) of the structural phase changeable recording layer in the first structural state is one and a half times as large as that of the structural phase changeable type recording layer in the second structural state.

3. An optical recording medium according to claim 2, wherein the structural phase changeable recording layer is made of a material which changes in structural phase between a crystalline state and an amorphous state; and an optical absorbance AC of the structural phase changeable recording layer in the crystalline state and an optical absorbance Aa of the structural phase changeable recording layer in the amorphous state have a difference thereof (Ac-Aa) in the range of 0% to 20%.

4. An optical recording medium according to claim 2, wherein the structural phase changeable recording layer is made of a material which changes in structural phase between a crystalline state and an amorphous state; and an optical absorbance Ac of the structural phase changeable recording layer in the crystalline state and the optical absorbance Aa of the structural phase changeable recording layer in the amorphous state have a difference thereof (Ac-Aa) in the range of 0% to 10%.

5. An optical recording medium according to claim 2, wherein the recording film includes a reflective layer formed on the second transparent layer.

6. An optical recording medium according to claim 2, wherein the structural phase changeable recording layer is made of a material containing antimony (Sb) and selenium (Se).

7. An optical recording medium according to claim 2, wherein the structural phase changeable recording layer is made of a material containing germanium (Ge) and tellurium (Te).

8. An optical recording medium according to claim 2, wherein the difference between the optical absorbance of the structural phase changeable recording layer in the first structural state and that of the structural phase changeable recording layer in the second structural state is 0% to 10% of the laser beam for reproducing.

9. An optical recording medium according to claim 2, wherein an optical phase shift $\Delta\phi$ of the laser beam for reproducing due to changes in the structural state is represented as $\Delta\phi=(1\pm2N)\pi$ (N is zero or an integer number).

10. An optical recording medium according to claim 2, wherein an optical phase shift $\Delta\phi$ of the laser beam for reproducing due to changes in the structural state is in the range represented as $3\pi/2 \geq \Delta\phi \geq \pi/2$, or $-3\pi/2 \leq \Delta\phi \leq -\pi/2$.

11. An optical recording medium according to claim 2, wherein a reflectance of the structural phase changeable recording thin film is 40% or more in any one of the first structural state and the second structural state.

12. An optical recording medium according to claim 2, wherein a reflectance of the structural phase changeable recording thin film is 20% or more in any one of the first structural state and the second structural state.

13. An optical recording medium according to claim 5, wherein the recording film includes a protective layer formed on the reflective layer.

14. An optical recording medium according to claim 1, wherein the refractive index of the recording film in the second structural state is 2.0 or more.

15. An optical recording medium according to claim 2, wherein the refractive index of the structural phase changeable recording layer in the second structural state is 2.0 or more.

* * * * *